(12) United States Patent
Wen-Yung

(10) Patent No.: US 6,413,034 B1
(45) Date of Patent: Jul. 2, 2002

(54) DISTRIBUTING/FEEDING DEVICE

(75) Inventor: Yang Wen-Yung, Ta-Li (TW)

(73) Assignee: Chum Power Machinery Corp. (TW)

( * ) Notice: Subject to any disclaimer, the term of this patent is extended or adjusted under 35 U.S.C. 154(b) by 1 days.

(21) Appl. No.: 09/643,856

(22) Filed: Aug. 23, 2000

(30) Foreign Application Priority Data

Aug. 27, 1999 (TW) ...................................... 88214652 U

(51) Int. Cl.[7] .............................................. B65G 59/10
(52) U.S. Cl. ................. 414/795.6; 414/797; 414/796.7; 425/534
(58) Field of Search ........................ 425/534; 414/795.6, 414/796.7, 797

(56) References Cited

U.S. PATENT DOCUMENTS

| | | | | |
|---|---|---|---|---|
| 3,957,415 A | * | 5/1976 | Edwards ...................... 425/403 |
| 4,024,963 A | * | 5/1977 | Hautau ......................... 414/797 |
| 4,763,890 A | * | 8/1988 | Zimmerman et al. .... 414/796.7 |
| 4,946,341 A | * | 8/1990 | Parsley et al. ........... 414/796.7 |
| 5,443,358 A | * | 8/1995 | Yanniello ................. 414/796.7 |
| 5,549,444 A | * | 8/1996 | Dubuit .................... 414/796.7 |
| 5,807,065 A | * | 9/1998 | Kuhl ........................ 414/796.7 |

* cited by examiner

*Primary Examiner*—Robert Davis
(74) *Attorney, Agent, or Firm*—Troxell Law Office PLLC

(57) ABSTRACT

Distributing/feeding device including: a rotary seat including a rotary disc, each time the rotary disc is driven, the rotary disc rotating by a predetermined angle, several material racks being disposed on predetermined portions of the rotary disc; a feeding mechanism disposed beside the rotary disc, the feeding mechanism including a lifting board and a driving member for driving the lifting board to up and down reciprocally move; and a clamping mechanism disposed above the feeding mechanism, the clamping mechanism including a clamping seat which is swingable within a predetermined range and a material taking member disposed on the clamping seat and up and down reciprocally movable. When the clamping seat is moved to a predetermined position, a predetermined section of the material taking member is just positioned above a material rack for fixedly holding a workpiece placed in the material rack. Numerous work pieces are at the same time placed in the material racks on the rotary seat. The clamping mechanism and the feeding mechanism are able to continuously take out the work pieces serially piled on the material racks one by one and sequentially feed the work pieces.

7 Claims, 5 Drawing Sheets

DISTRIBUTING/FEEDING DEVICE

BACKGROUND OF THE INVENTION

The present invention relates to an accessory apparatus of a blowing molding machine, and more particularly to a material distributing/feeding device for sequentially arranging and feeding bottle blanks to the blowing molding machine.

Most of the conventional plastic containers such as plastic bottles for containing therein mineral spring water, cola, juice, etc. are made of plastics by a blowing molding machine. In operation, many substantially tubular bottle blanks 1 are first placed into a material feeding/vibrating machine (not shown). The bottle blanks are released from an exit of the vibrating machine and sequentially arranged in unified direction. Then the bottle blanks 1 respectively drop into a space between a pair of inclined guide rods forming a rail 2 (as shown in FIG. 1). The bottle blanks 1 one by one-downward slide to a material feeding section of the blowing molding machine which serially heats and blows the bottle blanks 1 to mold the bottle blanks 1.

It is well known that for those materials with a considerable length and having larger outer diameter at head end, the conventional material feeding/vibrating machine can effectively sequentially release the materials from the exit of the vibrating machine with the head ends directed in the same direction. The tubular bottle blank has a considerable length and is formed with an annular flange around the open end so that it pertains to the above materials which can be arranged and released by the conventional vibrating machine.

The long tubular bottle blank can be especially molded into an elongated bottle body having a length much larger than the width for containing beverages such as mineral spring water and cola, However, when manufacturing a wide-mouth container such as fruit jelly can and sealed can, a conic bottle blank as shown in FIG. 2 must be adopted. Such conic bottle blank with small height while large width can be hardly arranged and released in unified direction by a general feeding/vibrating machine.

SUMMARY OF THE INVENTION

It is therefore a primary object of the present invention to provide a distributing/feeding device which is able to sequentially arrange numerous wide-mouth bottle blanks.

It is a further object of the present invention to provide the above distributing/feeding device for wide-mouth bottle blanks, which works more efficiently than manned feeding operation.

According to the above objects, the distributing/feeding device of the present invention includes: a rotary seat including a first driving member and a rotary disc, each time the rotary disc is driven by the first driving member, the rotary disc rotating by a predetermined angle, several material racks being disposed on predetermined portions of the rotary disc at certain intervals; a feeding mechanism disposed beside the rotary disc, the feeding mechanism including a lifting board and a second driving member for driving the lifting board to up and down reciprocally move; and a clamping mechanism disposed above the feeding mechanism, the clamping mechanism including a clamping seat which is swingable within a predetermined range and a material taking member disposed on the clamping seat and up and down reciprocally movable. When the clamping seat is moved to a predetermined position, a predetermined section of the material taking member is just positioned above a material rack for fixedly holding a work piece placed in the material rack. Numerous work pieces are at the same time placed in the material racks on the rotary seat. The clamping mechanism and the feeding mechanism are able to continuously take out the work pieces serially piled on the material racks one by one and sequentially feed the work pieces.

The present invention can be best understood through the following description and accompanying drawings wherein:

DETAILED DESCRIPTION OF THE PREFERRED EMBODIMENTS

Figure 1:
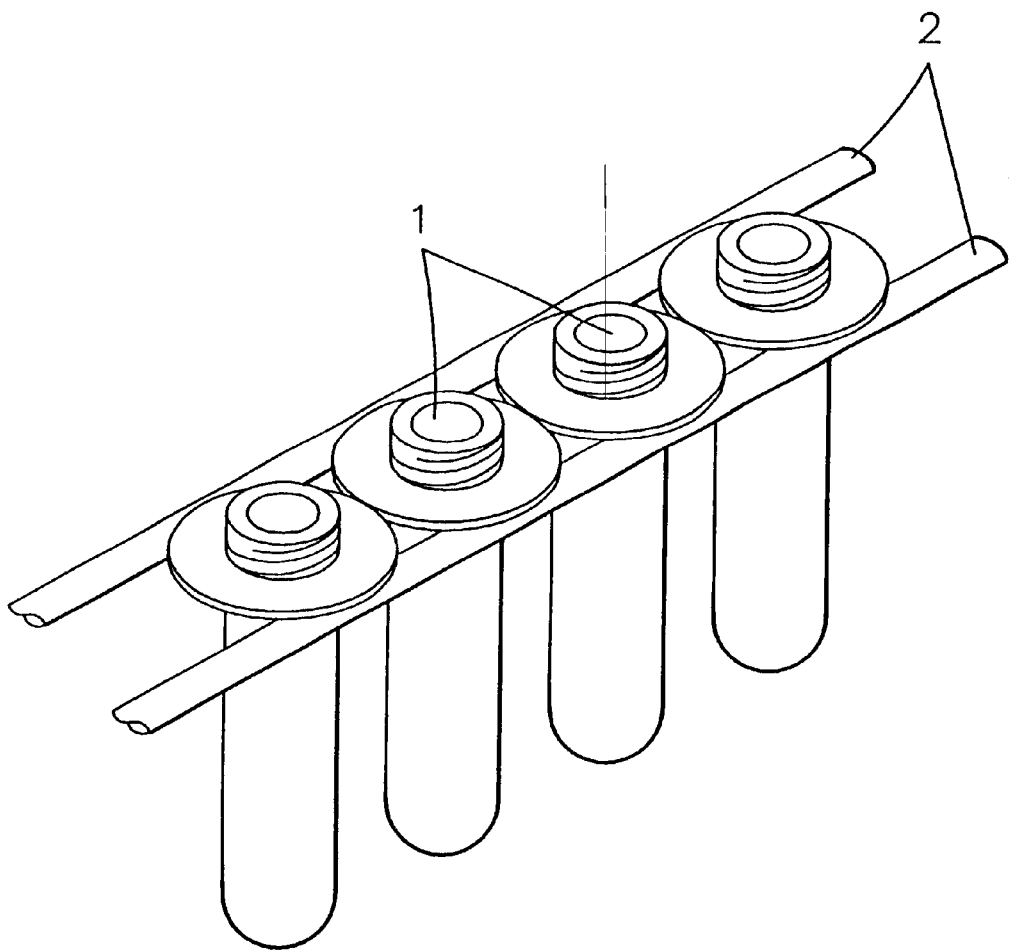
FIG. 1 is a perspective view showing the conventional tubular bottle blanks and the rail therefor.
Figure 2:
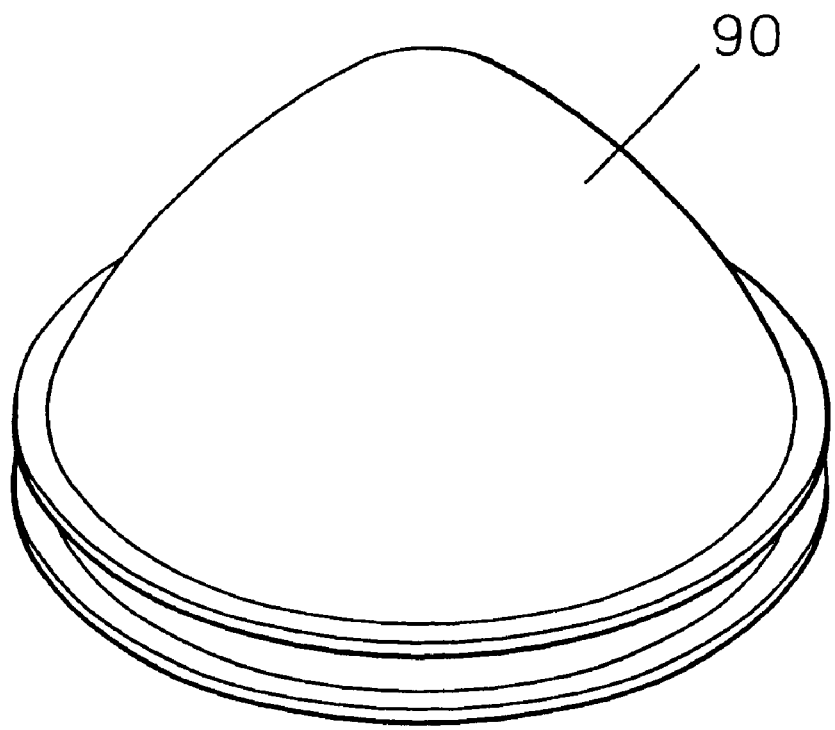
FIG. 2 shows the wide-mouth bottle blanks to which the present invention is applicable.
Figure 3:
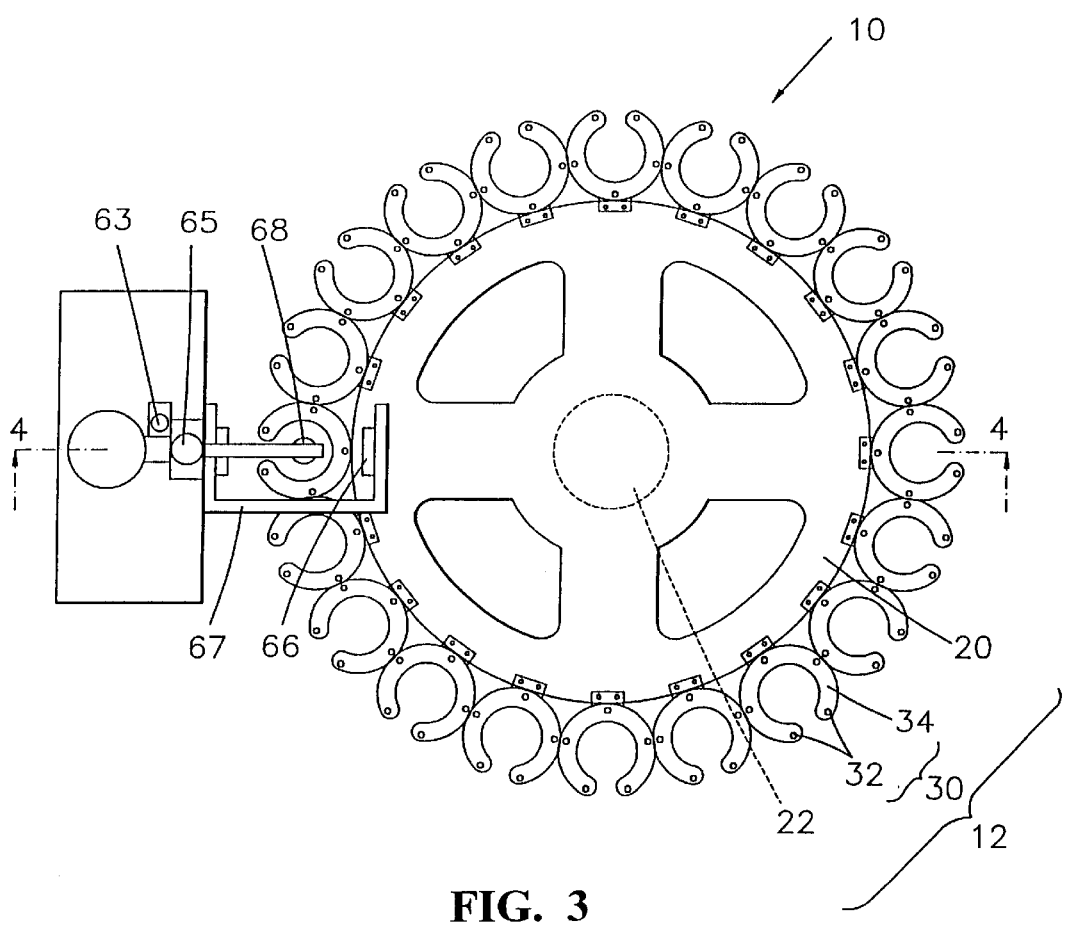
FIG. 3 is a top view of a preferred embodiment of the present invention.
Figure 4:
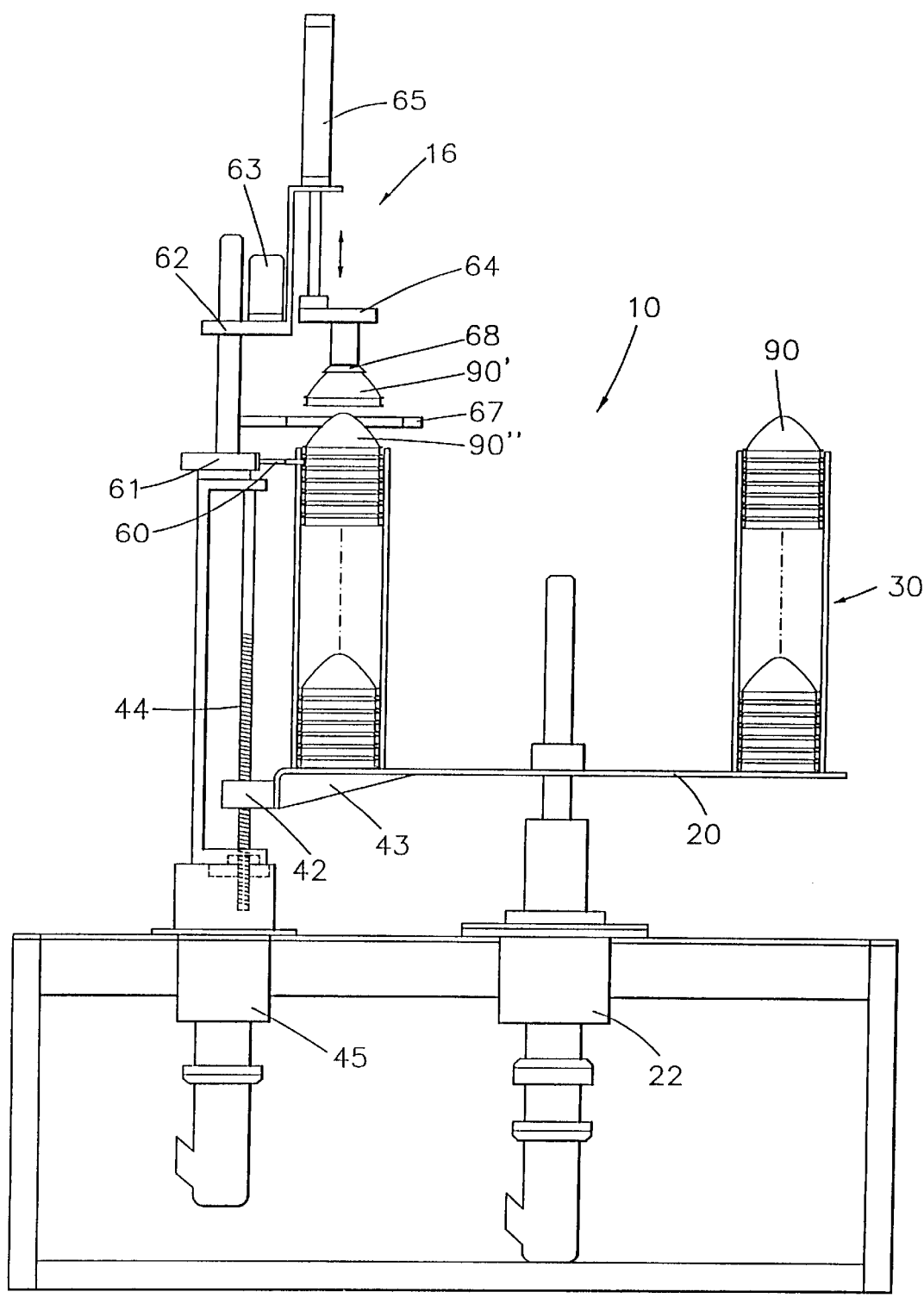
FIG. 4 is a sectional view taken along line 4—4 of FIG. 3.
Figure 5:
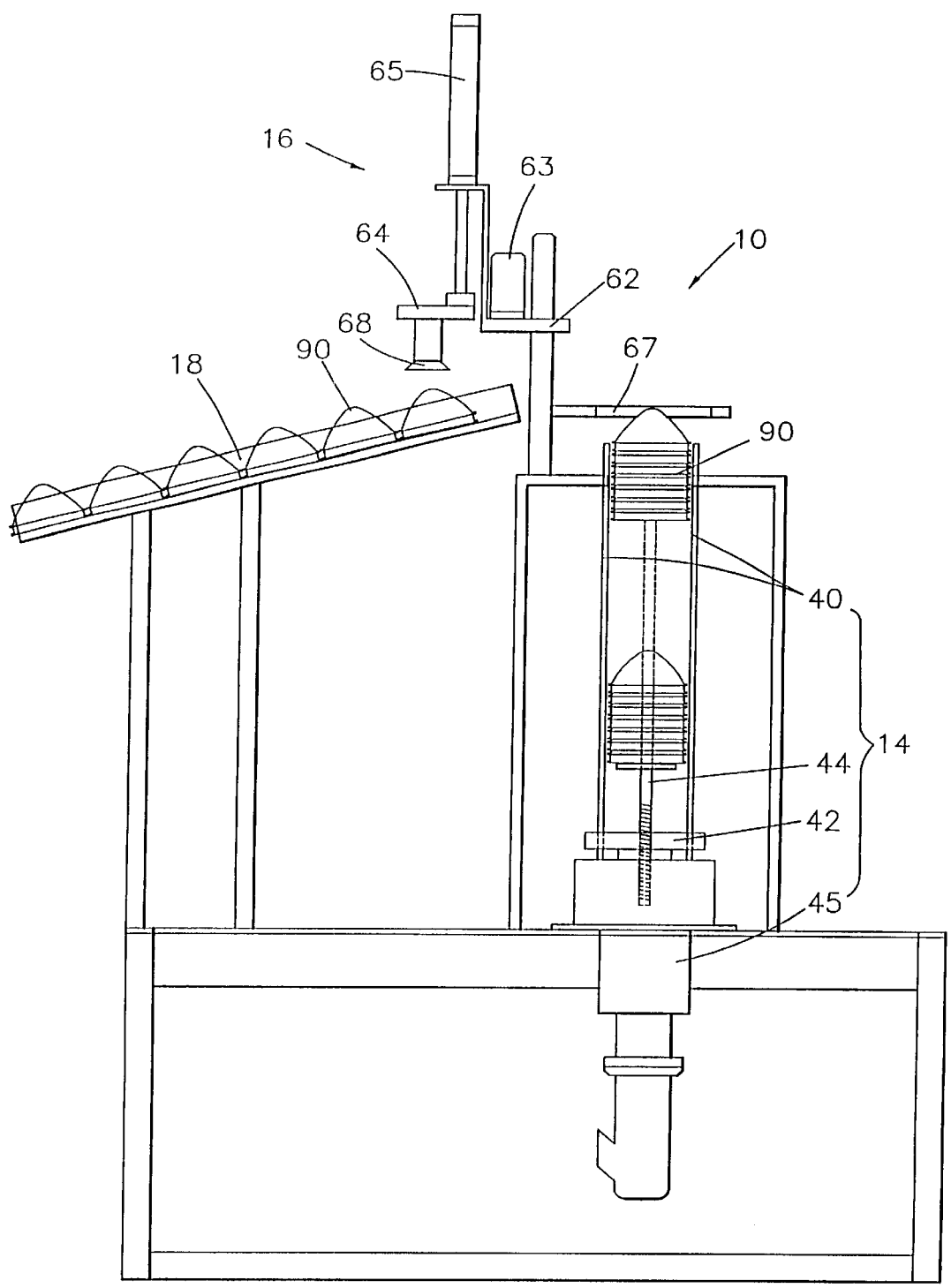
FIG. 5 is a front view of the feeding mechanism and the clamping mechanism of the preferred embodiment of the present invention.

Please refer to FIGS. 2 to 5. The distributing/feeding device 10 of the present invention includes a rotary seat 12, a feeding mechanism 14 and a clamping mechanism 16.

The rotary seat 12 includes a rotary disc 20 and several material racks 30. The rotary disc 20 is driven by a first motor 22 to intermittently rotate by a predetermined angle. The material racks 30 respectively have a certain length and are arranged along the circumference of the rotary disc 20 at equal intervals. Each material rack 30 includes five polished rod members 32 spaced from each other by a certain distance and a carrier board 34 disposed at the bottoms of the rod members 32 and having a certain width. The carrier board 34 is arched and has an opening facing outer side of the rotary disc 20. The five rod members 32 and the carrier board 34 define a space above the carrier board 34 for multiple bottle blanks 90 to pile therein.

The feeding mechanism 14 is disposed on outer side of the rotary seat 12, including: a pair of parallelly upward extending slide rods 40; a slide block 42 up and down movably bridged between the two slide rods 40, the slide block 42 having a lifting board 43 outward projecting by a certain length; and a guide thread rod 44, a lower end of the guide thread rod 44 being connected to a second motor 45, an upper section of the guide thread rod 44 upward extending in parallel to the two slide rods 40, the guide thread rod 44 being screwed through the slide block 42. After the second motor 45 is activated, the guide thread rod 44 can force the slide block 42 to move up and down.

The clamping mechanism 16 is disposed above the slide rods 40 and the guide thread rod 44, including a press rod 60, a clamping seat 62, a material taking member 64 and a sensing member 66. The press rod 60 is driven by a first pneumatic cylinder 61 to horizontally reciprocally move. The clamping seat 62 is driven by a third motor 63 to horizontally swing within a certain range. The material taking member 64 is disposed on the clamping seat 62 and driven by a second pneumatic cylinder 65 to move up and down. A sucker 68 is disposed at the end of the material taking member 64. The sucker 68 via a suitable hose and a valve (not shown) is connected to a vacuumizing device (not shown). The sensing member 66 is a photosensor disposed on two cantilevers 67.

In operation, multiple bottle blanks 90 are piled into multiple long series. Each series is positioned in one material rack 30. One of the material racks 30 is positioned opposite to the feeding mechanism 14 with the lifting board 43 positioned under the material rack 30. Once the distributing/feeding device 10 is activated, the sensing member 66 above the material rack 30 immediately detects whether there are bottle blanks 90 positioned between the cantilevers 67. Once it is found that there is no bottle blank 90 positioned between the cantilevers 67, a preset controlling circuit (not shown) activates the second motor 45 to force the slide block 42 to drive the lifting board 43 to move upward to the lower side of the material rack 30. The lifting board 43 can just pass through the opening of the carrier board 34 to push and lift the series of bottle blanks 90 by a small distance until the sensing member 66 again detects that there are bottle blanks 90 reaching the predetermined position.

Once the bottle blanks 90 reach the position, the press rod 60 of the clamping mechanism 16 extends outward with its free end abutting against the second uppermost bottle blank 90" at the top end of the series of bottle blanks 90. At the same time, the clamping seat 62 is lowered and the sucker 68 is opposed against the uppermost bottle blank 90' to firmly suck the same. Then the clamping seat 62 carries the sucked bottle blank 90' to move upward together. Then the third motor 63 is activated to force the clamping seat 62 to swing by a certain angle toward the upper side of a carrier rail 18 beside the rotary seat 12. Then, the sucker 68 releases the bottle blank 90' which drops onto the slightly inclined carrier rail 18, whereby the bottle blank 90' can move downward to a feeding section of a blowing machine (not shown).

After the originally uppermost bottle blank 90' is taken away, the sensing member 66 again emits a signal to order the press rod 60 to retract and activates the feeding mechanism 14 to further push up the corresponding series of bottle blanks 90. Accordingly, the originally second uppermost bottle blank 90" pressed by the press rod 60 is moved upward to the highest point. Therefore, the bottle blank 90" becomes the first bottle blank 90' to be taken away by the clamping mechanism 16 in next operation.

When the lifting board 43 is moved to an upper limit position, that is, all the bottle blanks 90 in the corresponding material rack 30 have been taken away, the slide block 42 drives the lifting board 43 to lower and the first motor 22 in the rotary seat 12 then drives the rotary disc 20 to rotate by a certain angle, whereby another material rack 30 is positioned opposite to the feeding mechanism 14.

According to the above arrangement, the distributing/feeding device 10 of the present invention is able to sequentially place the numerous previously prepared bottle blanks 90 into the carrier rail 18, whereby the bottle blanks 90 can be well automatically fed into the blowing machine which blows the wide-mouth bottle blanks into containers. Therefore, the automatic production efficiency can be enhanced.

It should be noted that the first, second and third motors 22, 45, 63 and the first and second pneumatic cylinders 61, 65 serve as driving members for rotating or reciprocating the corresponding members. The present invention is not limited to these measures. For example, the third motor 63 for swinging the clamping seat 62 can be replaced with a pneumatic cylinder (not shown). Under such circumstance, the arch swinging track of the clamping seat 62 is substituted by a linearly reciprocating track. However, such change is determined by the relative positions between the carrier rail 18 and the clamping seat 62 and can be modified.

The above embodiments are only used to illustrate the present invention, not intended to limit the scope thereof, Many modifications of the above embodiments can be made without departing from the spirit of the present invention.

What is claimed is:

1. A distributing and feeding device comprising:
   a rotary seat including a rotary disc rotatable about a predetermined axis;
   a first driving member disposed on the rotary seat and intermittently driving the rotary disc, whereby each time the rotary disc is driven, the rotary disc rotates by a predetermined angle;
   a plurality of material racks mounted on a periphery of the rotary disc and extending outwardly therefrom, each material rack including a C-shaped carrier board with an axial opening therethrough and a lateral opening communicating with the axial opening, the carrier board configured to receive multiple work pieces piled thereon;
   a feeding mechanism located laterally adjacent to a path of movement of the material racks and having a lifting board being reciprocally movable up and down between a first position beneath an adjacent carrier board and a second position above the carrier board through the axial and lateral openings in the carrier board;
   a second driving member connected to the feeding mechanism for driving the lifting board up and down; and,
   a clamping mechanism having a clamping seat positioned above the rotary disc, the clamping seat being swingable within a predetermined range, a material taking member being disposed on the clamping seat so as to be movable up and down within a predetermined range, whereby when the clamping seat is moved to a predetermined position, the material taking member is positioned above carrier board to fixedly hold a work piece.

2. The distributing and feeding device as claimed in claim 1, further comprising a sensing member positioned between the clamping mechanism and one of the material racks, such that after one work piece is taken out by the clamping mechanism, the sensing member detecting this and immediately via a preset circuit outputting a signal, whereby the second driving member drives the lifting board to upward push a series of work pieces thereabove to move upward to a predetermined position.

3. The distributing and feeding device as claimed in claim 2, wherein the sensing member is positioned in a location corresponding to a top end of the pile of work pieces for detecting whether an uppermost work piece has been lifted to a predetermined position.

4. The distributing and feeding device as claimed in claim 1, wherein the material taking member includes a sucker device, the sucker device being connected to a vacuum device to fixedly hold a work piece thereon.

5. The distributing and feeding device as claimed in claim 1, further comprising a reciprocally movable press rod disposed adjacent to one side of a top end of a pile of work pieces under the material taking member, whereby when the clamping mechanism takes out an uppermost work piece, an outward extending section of the press rod abuts against a second uppermost work piece immediately adjacent to the taken out work piece.

6. The distributing and feeding device as claimed in claim 1, wherein the feeding mechanism includes a pair of parallel slide rods and a slide block movable up and down on two slide rods, the lifting board being connected to the slide block, the feeding mechanism further including a guide thread rod, the guide thread rod being connected to the second driving member, and screwed with the slide block, whereby the second driving member can via the guide thread rod move the slide block up and down and drive the lifting board to reciprocally move in parallel to the slide rods.

7. The distributing and feeding device as claimed in claim 1, wherein each material rack includes a plurality of parallel rod members which are annularly arranged on the carrier board.

* * * * *